United States Patent
Stine et al.

(10) Patent No.: US 7,373,179 B2
(45) Date of Patent: May 13, 2008

(54) CALL QUEUE IN A WIRELESS DEVICE

(75) Inventors: Ted Stine, Belle Mead, NJ (US);
Joseph A. Speeney, Basking Ridge, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 399 days.

(21) Appl. No.: 10/017,629

(22) Filed: Dec. 13, 2001

(65) Prior Publication Data
US 2003/0114197 A1    Jun. 19, 2003

(51) Int. Cl.
*H04B 1/38*    (2006.01)
*H04M 1/00*    (2006.01)

(52) U.S. Cl. .............. 455/564; 455/445; 455/551; 455/414.1; 455/418

(58) Field of Classification Search ........... 455/445, 455/414.1, 551, 564, 418
See application file for complete search history.

(56) References Cited

U.S. PATENT DOCUMENTS

| | | | |
|---|---|---|---|
| 5,600,704 A * | 2/1997 | Ahlberg et al. ........... 455/445 |
| 5,644,624 A * | 7/1997 | Caldwell .................... 379/69 |
| 5,844,980 A * | 12/1998 | Patel et al. ............. 379/88.22 |
| 5,890,064 A * | 3/1999 | Widergen et al. .......... 455/445 |
| 6,034,687 A * | 3/2000 | Taylor et al. ............... 345/775 |
| 6,223,046 B1 * | 4/2001 | Hamill-Keays et al. ..... 455/512 |
| 6,363,411 B1 * | 3/2002 | Dugan et al. ............... 709/202 |
| 6,473,615 B1 * | 10/2002 | Theppasandra et al. ..... 455/445 |
| 6,721,577 B2 * | 4/2004 | Humes ....................... 455/564 |
| 2004/0224682 A1 * | 11/2004 | Kang ........................ 455/433 |

OTHER PUBLICATIONS

"User's Guide: Nokia 8310"; Nokia Mobile Phones Ltd.; Sep. 2001.

* cited by examiner

*Primary Examiner*—Sujatha Sharma
(74) *Attorney, Agent, or Firm*—Davis Wright Tremaine LLP

(57) ABSTRACT

A wireless phone includes a memory, a processor, and a call queue function, the call queue function to enable the configuration and storage in the memory of a call queue, the call queue comprising an ordered list of entries to dial, wherein the processor and the memory cooperate to enable the call queue function.

16 Claims, 4 Drawing Sheets

CALL QUEUE IN A WIRELESS DEVICE

TECHNICAL FIELD

This invention relates to call queues. More specifically, the invention relates to user configuration of a call queue and management of the queue for communication devices.

BACKGROUND

Wireless communication has become highly popular. Every day, people all over the world communicate using wireless telephones and pagers, to name just some of the wireless applications. Wireless networks are increasingly employed to communicate non-voice information, such as stock quotes, email, and text. Wireless networks may be global and span the equipment and services of multiple service providers.

Wireless telephones have been criticized as a distraction to their users, especially while the users are driving or otherwise in transit. There have been reports of accidents resulting from distracted drivers who take their eyes off the road in order to dial their wireless phones. For this and for reasons of general convenience, efforts have been made to make dialing from wireless phones more convenient and less distracting.

One approach which addresses these concerns is to assign frequently called numbers to "speed dial" functions. Operating the speed dial function for a number causes the phone to dial the number. A limitation of this approach is that the number of speed dial functions is limited, and the user may still be distracted by the process of locating and operating the correct speed dial function for the number they wish to call.

Another approach involves electronic address books stored by the phone. Address books allow the phone user to associate names with numbers. The user locates in the address book the name of the party they wish to contact, and then causes the phone to dial the corresponding number. Again, a disadvantage is the distraction inherent in locating a name in the address book.

SUMMARY

In one aspect, a wireless phone includes a memory, a processor, and a call queue function, the call queue function to enable the configuration and storage in the memory of a call queue, the call queue comprising an ordered list of entries to dial, wherein the processor and the memory cooperate to enable the call queue function.

In another aspect, a communication system of a communication service provider includes a first computer system having a call queue for a wireless device. The call queue is indexed by an identification of the wireless device. A queue management function provides a next number to dial from the call queue in response to receipt of a queue dial request from the wireless device.

DRAWINGS

DESCRIPTION

In the following figures and description, like numbers refer to like elements. References to "one embodiment" or "an embodiment" do not necessarily refer to the same embodiment, although they may. Although various embodiments described herein are described and illustrated in conjunction with wireless devices, the present invention is also applicable to communication devices which operate in a wired fashion. While some embodiments are discussed in terms of phones, the principles of the present invention are applicable to a range of devices, including hand-held and portable computers, and paging devices.

According to one embodiment, a user of a communication device, such as a wireless telephone, configures a call queue. Each time a number is dialed from the call queue, the number is then removed from the call queue. According to another embodiment, dialed numbers remain in the call queue, and the call queue is managed in a "round-robin" fashion. According to one embodiment, a next number to dial is both selected and dialed from the call queue by operating a single function (for example, by operating a single button or a multiple-button combination on the phone). According to another embodiment, operating a first function selects a next number of the call queue, and operating a second function dials the number. The next number may be chosen sequentially, or according to a user-defined order, or in various other manners.

Often, the user will configure the call queue prior to travel or other situations where distractions due to dialing should be reduced. The call queue may be stored by a communication service provider, or by the wireless device. The call queue comprises numbers which may be conveniently selected and dialed by operating one or a few device functions. For example, in one embodiment a single button of a wireless phone, or a single spoken command, may initiate dialing to first number of the call queue. Upon completion of the call to the first number, the first number is removed from the call queue, and operating the dial function a second time dials a next number of the call queue. Alternately, the next number may be dialed automatically after completion of the first call.

Figure 1:
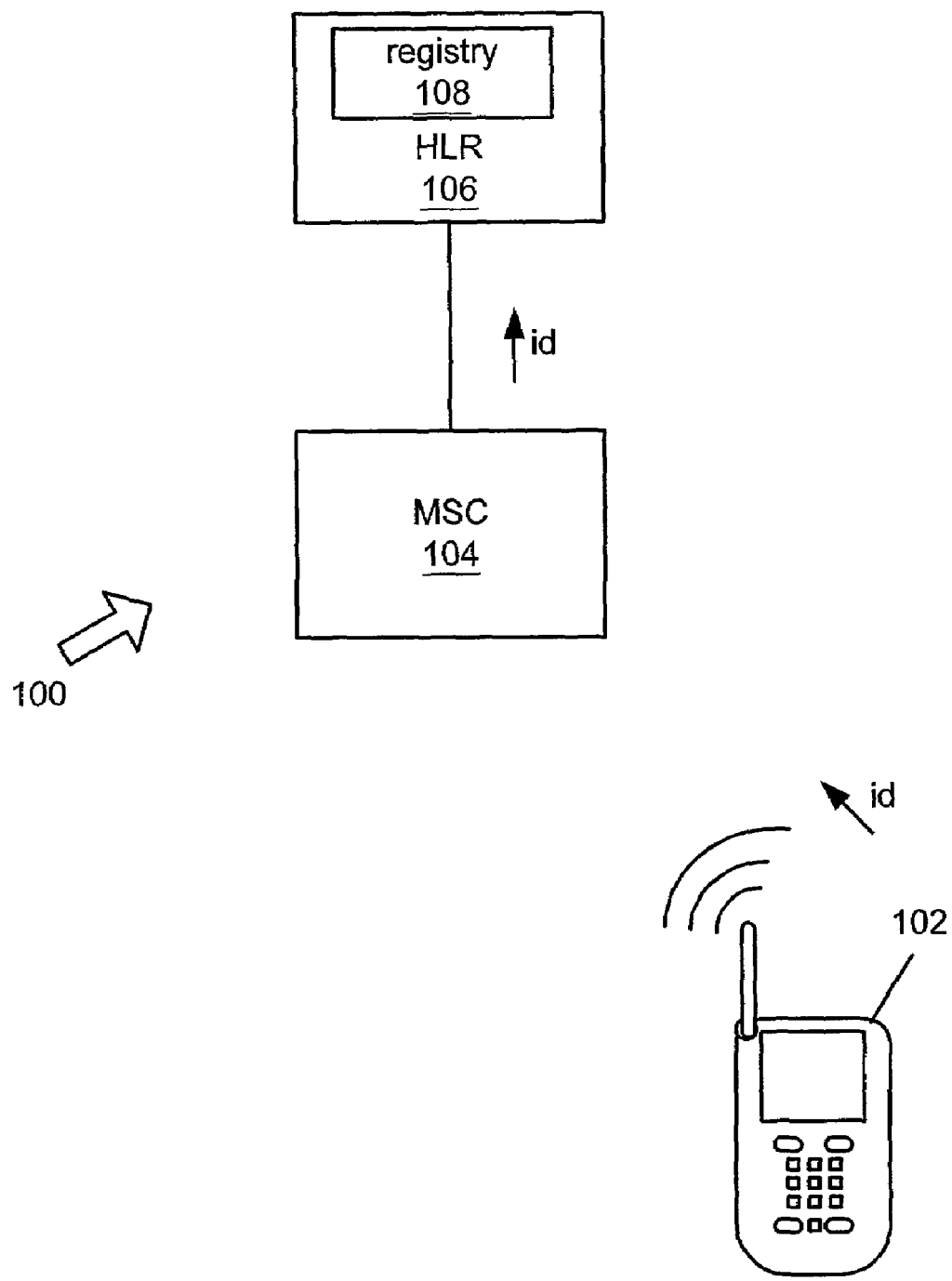
FIG. 1 is a block diagram of an embodiment of a communication system.

FIG. 1 is a block diagram of an embodiment 100 of a wireless communication system. To access the system, a wireless device such as a phone 102 may communicate with a mobile switching center (MSC) 104. The MSC 104 may operate as a wireless "front end" to the communication service provider, by converting wireless signals to a form suitable for transmission in electrical or optical form. The MSC 104 may communicate with a home location registry (HLR) 106 which may comprise a user registry 108. The HLR 106 may employ an identification (id) provided by the phone 102 to locate a record in the registry 108 for the user of the phone 102. The user record may comprise permissions in accordance with the user's selected service plan, as well as other information about the user. The HLR 106 may communicate the service plan permissions to the MSC 104, and the MSC 104 may then provide the user's phone 102 or other wireless device with access to the network in accordance with the permissions. For example, if the user's service plan comprises data services, the permissions to the MSC 104 may enable the wireless device to send and receive email via the network. If data service is lacking from the service plan, the permissions may enable only voice access.

The HLR 106 may comprise a single computer system, or a 'site' or computer center, e.g. a system of more than one computer and associated peripheral equipment. A computer system is any device comprising a processor and a memory, wherein the memory stores instructions and data (together, logic). The memory may provide the instructions to the processor for execution, to manipulate the data. The MSC 104 may comprise a combination of computer systems, switching systems, and wireless signaling systems.

Figure 2:
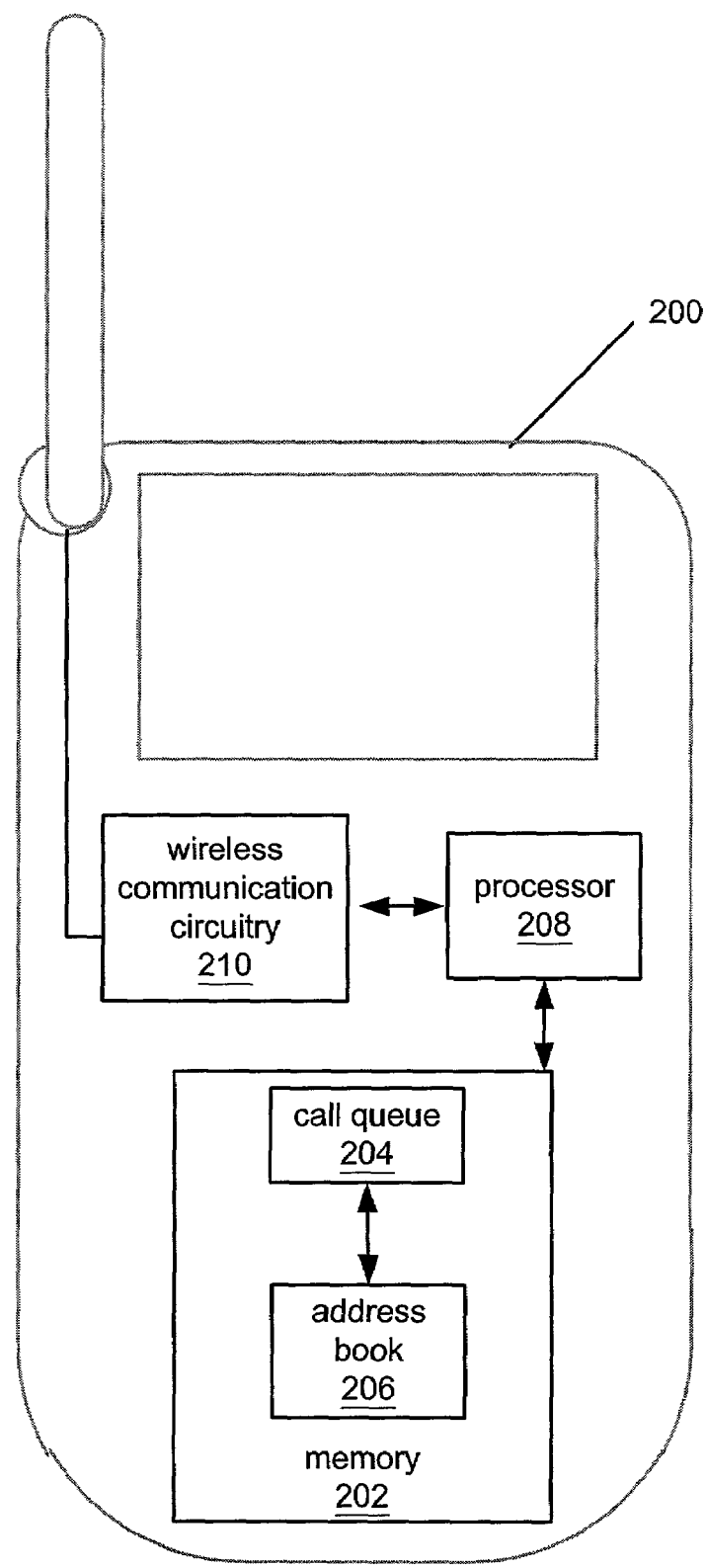
FIG. 2 is a block diagram of an embodiment of a wireless communication device.

According to one embodiment, the phone 102 or other wireless device may store a user-configured call queue. In another embodiment, the user registry 108 may be utilized to store the call queue. FIG. 2 is a block diagram which shows an embodiment 200 of a wireless phone comprising a call queue. The phone 200 comprises a memory 202 and a processor 208. Instructions and data stored by the memory 202 may be supplied to the processor 208, which may execute the instructions and operate upon the data in order to carry out dialing and other communication functions. The memory 202 may comprise one or a combination of various storage technologies such as flash memory, ROM, CMOS, RAM, and so on. The processor 208 is coupled to the wireless communication circuitry 210 to exchange signals wirelessly with the MSC 104.

In one embodiment, the memory 202 may comprise a call queue 204 and an address book 206. The address book 206 comprises names associated with the numbers of dial-able parties. The address book 206 is organized as a collection, in the sense that it is unordered. The call queue 204 comprises one or more numbers organized and managed as a queue, e.g. as an ordered list. Operation of a queue dialing function of the phone causes a first number of the queue to be dialed to initiate a first call. Examples of a dial function are pressing a button and speaking a command to the phone. Operation of the queue dialing function a second time results in dialing of a second number. Subsequent to dialing a number, and as a result of operation of the queue dialing function, the dialed number may be removed from the queue. In other words, the queue may be consumed as a consequence of dialing. Once all numbers of the queue are dialed, the queue is empty and ready to be reconfigured with more numbers.

The call queue 204 may initially be empty when the phone 102 is sold or otherwise distributed. The phone 102 as distributed may comprise call queue functionality to enable a user to specify entries of the call queue 204, and possibly also to specify a dial order for the entries. The call queue function may comprise instructions and data stored in the memory 202 of the phone 102. The instructions and data may be provided to the processor 208 which, in cooperation with the memory 202 and various buttons, spoken commands, prompts (visual or otherwise), and other controls of the phone 102 may operate to configure and store the call queue 204 in the memory 202.

Likewise, the address book 206 may initially be empty when the phone 102 is sold or otherwise distributed. The phone 102 as distributed may comprise address book functionality to enable a user to specify entries of the address book 206. The address book function may comprise instructions and data stored in the memory 202 of the phone 102. The instructions and data may be provided to the processor 208 which, in cooperation with the memory 202 and various buttons, spoken commands, prompts (visual or otherwise), and other controls of the phone 102, may operate to configure and store the address book 206 in the memory 202.

Use of the call queue 204 may reduce dialing distractions experienced by users of communication devices, particularly wireless communication devices. For example, prior to driving a car, a user of the phone 200 may enter several numbers into the call queue 204 using a keypad of the phone 200, or by speaking the numbers when the voice comprises voice recognition. The queue 204 and the address book 206 may be coupled, so that the user may specify call queue entries by name instead of number. Prior to dialing, the address book 206 is accessed to retrieve the number corresponding to the name. By operating the queue dialing function, the user may, while driving, initiate calls to all of the numbers in the queue without incurring the distraction of entering the digits to dial, or locating a particular speed dial button, or locating a name in the address book. In one embodiment, operating the queue dialing function a single time initiates dialing to the first number in the queue. Upon terminating (disconnecting) the first call, dialing to the second number in the queue 204 may be automatically initiated, and so on. In other embodiments, the queue dial function is operated each time a next queue entry is to be dialed.

In one embodiment, the user may specify an ordering for dialing the entries of the queue 204 which is non-sequential. In another embodiment, the entries of the queue are dialed in the order, or reverse order, in which they were entered.

Figure 3:
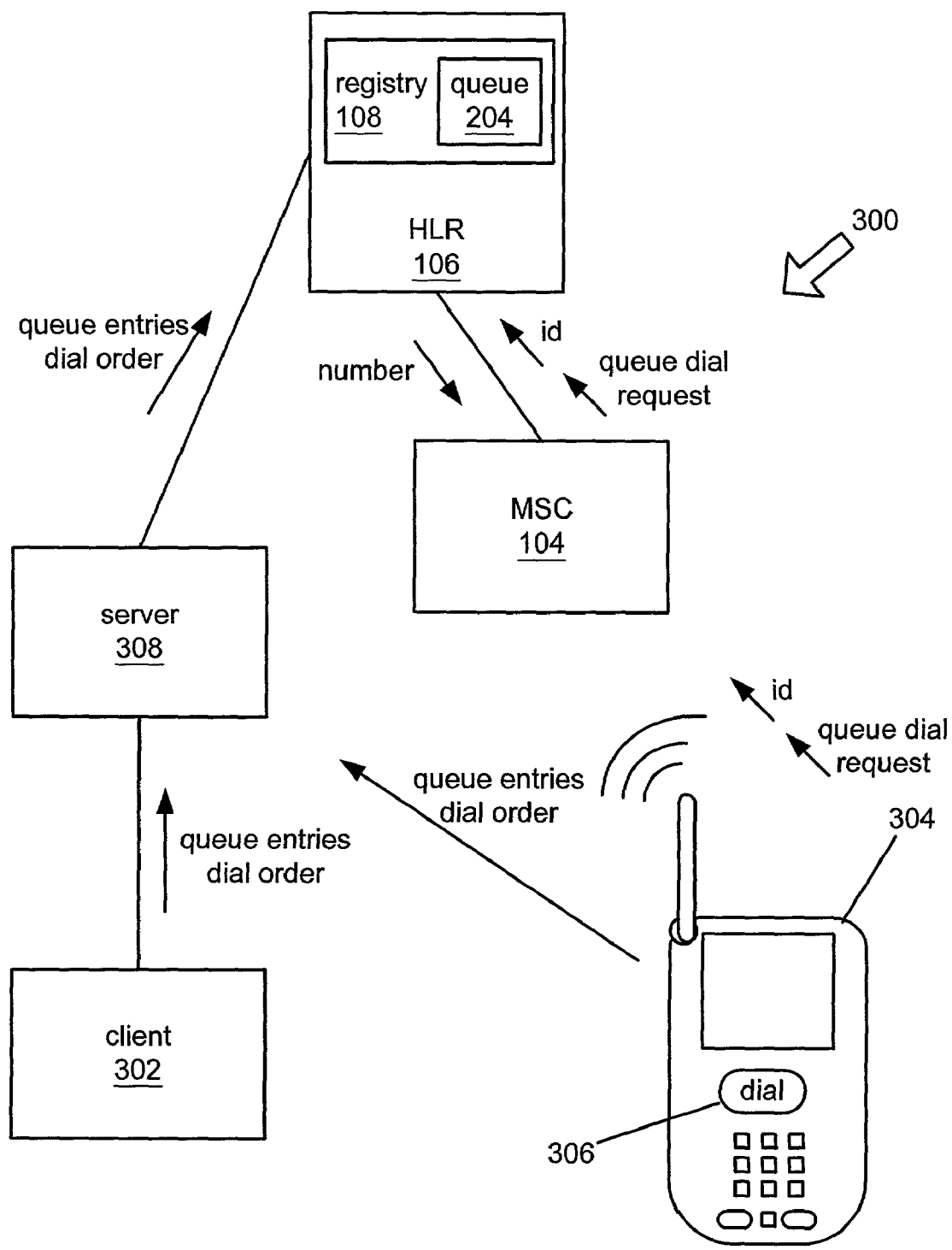
FIG. 3 is a block diagram of an embodiment of a communication system.

FIG. 3 is a block diagram of an embodiment 300 of a communication system in accordance with the present invention. The user registry 108 of the HLR 106 comprises the call queue 204 for a wireless device user. Within the registry 108, the call queue 204 may be comprised by a record for the user. The user may configure the call queue 204 using a client device 302, which may comprise any computing device capable of communicating with a server 308 over a network (not shown). Examples of networks include telephone networks, the Internet, and private voice and data networks. The server 308 acts as a front end to the HLR 106, providing isolation and security, buffering, and traffic management, among other things. Both the client 302 and the server 308 may be any computing devices comprising a memory and a processor, the memory storing instructions which may be supplied to and executed by the processor, the memory further storing data which may be operated upon by the executed instructions. In one embodiment, the server 308 is an Internet server. Examples of client devices are hand-held computers, laptop and sub-notebook computers, desktop computers, automobile computers, and so on. In one embodiment, the phone 304 may act as the client 302 for configuring the queue 204. The client 302 (or the phone 304) may provide queue entries to the server 308. In some embodiments, the client 302 (and/or phone 304) may also provide a dial order for the queue entries. The server 308 provides the queue information (entries, and possibly the dial order) to the HLR 106, and the HLR 106 associates the queue information with the user in some manner, for example in the user record in the registry 108.

Subsequently, the phone 304 or other wireless device may be operated to dial the queue entries. The user may operate a queue dial function, such as button 306, in order to dial entries from the queue. Operation of the queue dial function results in the phone 304 communicating a queue dial request to the MSC 104. An id also is provided from the phone 304 to the MSC 104, which passes the id and queue dial request to the HLR 106. The id and the queue dial request may be passed together, or separately. The HLR 106 employs the id to identify the wireless device and to locate the call queue 204 for the user. In other words, the call queue is indexed according to the identification of the wireless device.

In one embodiment, the HLR 106 uses the id to look up the user record for the user in the registry 108. The HLR 106 may comprise a queue management function to provide the next entry in the queue 204 to the MSC 104, and the MSC 104 proceeds, in known manners, to dial and connect a call between the party corresponding to the entry and the phone 304. The queue management function may comprise instructions and data which may be executed by a computer system of the HLR 106.

In situations where the phone 304 is roaming away from a home service area, the HRL 106 may communicate the call queue 204 to a visitor location register (VLR—not shown). The VLR may then provide to an MSC in the roaming service area the numbers from the queue 204 in response to a queue dial request from the phone 304.

Figure 4:
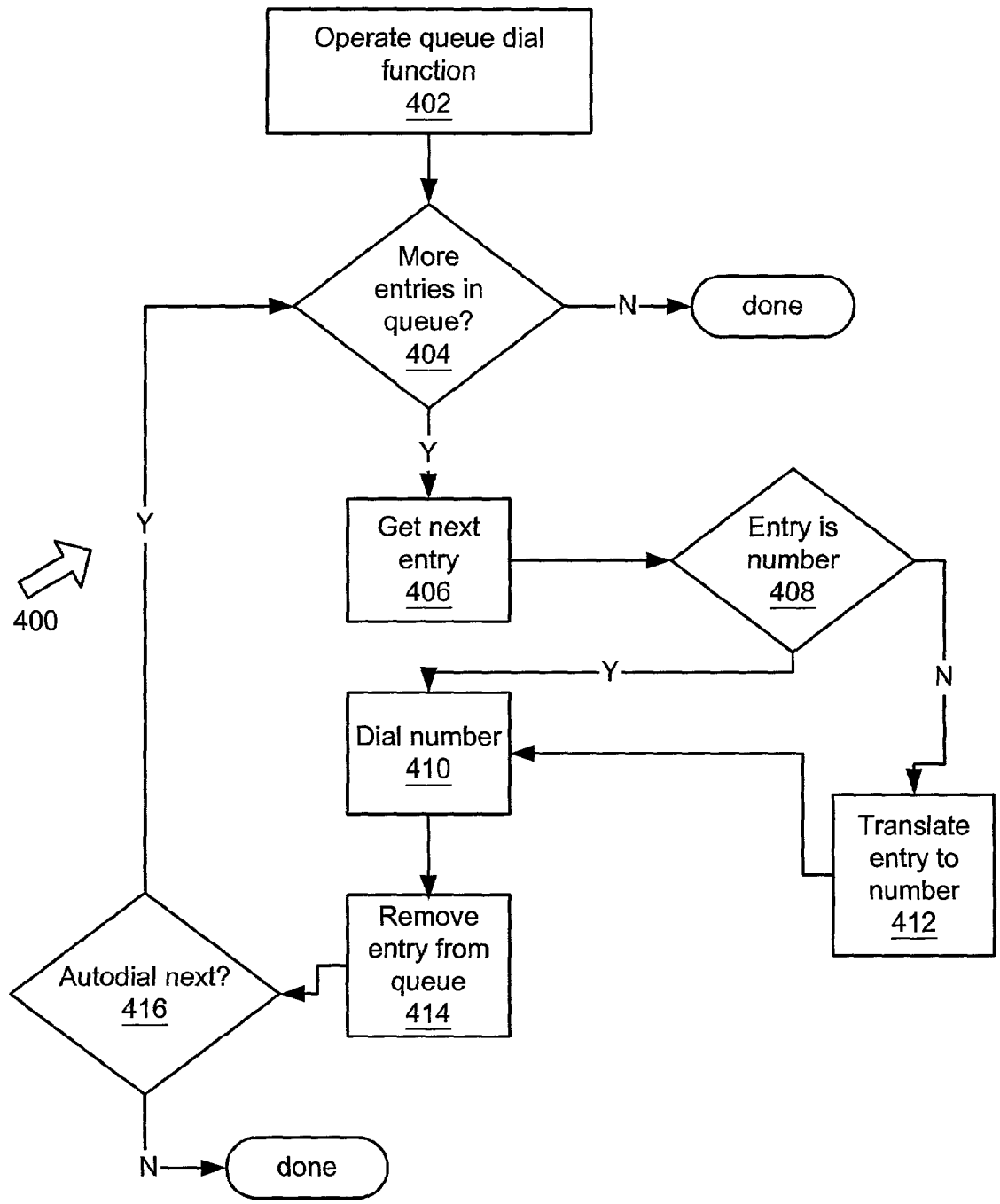
FIG. 4 is a flow chart of a method embodiment.

FIG. 4 is a flow chart of an embodiment 400 of a method of managing a call queue. At 402 a user of a phone or other communication device operates a queue dial function. A check at 404 determines whether more entries remain in the queue. If not, the method concludes. If so, the next entry is retrieved at 406. A check at 408 determines whether the next entry is a dial-able number. If so, the number is dialed at 410. If not (for example, the entry is a name from the address book), the entry at 412 is translated into a dial-able number (for example, by looking up the number corresponding to the name in the address book). After the number is dialed at 410, in embodiments in which the queue is consumed, the entry is removed from the queue at 414. In alternate embodiments where the queue is not consumed, the entry may be left in the queue. A check at 416 determines whether to automatically dial the next entry in the queue. Not all embodiments may include this check—in some embodiments, the next queue entry may always be dialed automatically after a previous call terminates. Still other embodiments may not provide the ability to automatically dial the next queue entry. If auto dialing is not enabled, the method 400 concludes. Otherwise, the method 400 returns to 404 to determine whether more entries are in the queue.

In view of the many possible embodiments to which the principles of the present invention may be applied, it should be recognized that the detailed embodiments are illustrative only and should not be taken as limiting in scope. Rather, the present invention encompasses all such embodiments as may come within the scope and spirit of the following claims and equivalents thereto.

What is claimed is:

1. A wireless phone configured for use by a user and configured to communicate with a server over a network, the server being configured to communicate with a plurality of wireless phones and comprising a plurality of outgoing call queues, each outgoing call queue of the plurality of outgoing call queues comprising a list of entries to dial and being associated with a unique call queue identifier that associates the outgoing call queue with a particular wireless phone of the plurality of wireless phones or user thereof, the wireless phone comprising:
   a memory;
   a processor;
   a call queue function configured to enable the configuration of an outgoing call queue of the plurality of outgoing call queues, the outgoing call queue being the outgoing call queue having the unique call queue identifier associated with the particular wireless phone or user thereof; and
   a queue dial function which, when operated, cooperates with the server to result in a dialing of a first entry of the outgoing call queue associated with the particular wireless phone, wherein the queue dial function is configured to direct the processor to send the call queue identifier to the server, and the server is configured to use the call queue identifier to locate the outgoing call queue associated with the particular wireless phone from among the plurality of outgoing call queues, and wherein the processor and the memory cooperate to enable the call queue function.

2. The phone of claim 1 further comprising:
   the queue dial function which, when operated once, results in dialing all entries of the outgoing call queue in the order of the list.

3. The phone of claim 1 further comprising:
   an address book function to enable the configuration and storage of an address book in the memory, the address book comprising a collection of at least one names and associated dialable numbers; and
   the queue dial function to cooperate with the address book to locate a dialable number associated with a name in the outgoing call queue.

4. A communication system of a communication service provider, comprising:
   a first computer system, comprising:
   a plurality of call queues each associated with a call queue identifier identifying a wireless device associated with the call queue, each call queue comprising one or more numbers to dial;
   a queue selection function configured to receive a call queue identifier from a wireless device and use the call queue identifier to locate a call queue associated with the wireless device from among the plurality call queues; and
   a queue management function configured to provide a next number to dial from the located call queue in response to receipt of a queue dial request from the wireless device.

5. The communication system of claim 4 further comprising:
   a user database, the user database comprising the plurality of call queues.

6. The communication system of claim 4 further comprising:
   a second computer system configured to receive queue entries from a client device, and
   communicate the queue entries to the first computer system.

7. The communication system of claim 6 wherein the second computer system comprises an Internet server.

8. The communication system of claim 4 wherein the queue management function removes the next number to dial from the located call queue as a result of providing the number.

9. The communication system of claim 4 further comprising:
   a mobile switching center to receive the next number from the first computer system and to connect a call to the next number with the wireless device.

10. The communication system of claim 4 further comprising:
    the queue management function to provide each number of the located call queue in a dial order, in response to receipt of the queue dial request from the wireless device.

11. The communication system of claim 10, wherein the dial order is provided from the wireless device.

12. The communication system of claim 10 wherein the dial order is one of the order and the reverse order of an order in which the located call queue numbers were specified by the wireless device.

13. The wireless phone of claim 1 further comprising a plurality of buttons, wherein the queue dial function is operated by a single button of the plurality of buttons.

14. The wireless phone of claim 1 wherein the queue dial function is operated by speaking a queue dial command to the wireless phone.

15. A method comprising:
- locating a call queue from among a plurality of call queues using a queue identifier;
- dialing a first number of the located call queue in response to an operation of a queue dial function in a wireless communication device;
- initiating a live communication between a user of the wireless communication device and a user of a device associated with the first number of the located call queue;
- dialing a next number of the located call queue in response to the operation of the queue dial function;
- removing the first number from the call queue as a result of dialing the first number; and
- removing the next number from the call queue as a result of dialing the next number.

16. One or more computer-readable media having computer-executable instructions for performing the method of claim 15.

* * * * *